INVENTOR.
EDWARD KLOSZEWSKI

United States Patent Office 3,056,444
Patented Oct. 2, 1962

3,056,444
SKID CHAIN
Edward Kloszewski, 1212 E. 7th St., Erie, Pa.
Filed Jan. 15, 1960, Ser. No. 2,675
1 Claim. (Cl. 152—221)

This invention relates to skid chains and, more particularly, to skid chains for improving the traction of rubber vehicle tires and the like on slippery surfaces.

The ordinary skid chain is made of metal. Metal chains wear quickly when the vehicle is driven on bare roads. Further, metal chains are inclined to cut the tire and to cause vibration which is likely to damage the vehicle body. Non-metallic cross chains have been suggested; however, those suggested have various disadvantages, including lack of strength and thick cross chains.

It is, accordingly, an object of this invention to provide an improved skid chain.

Another object of this invention is to overcome the disadvantages in previous non-metallic skid chains.

A further object of the invention is to provide an improved traction device.

Yet a further object of the invention is to provide a skid chain which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
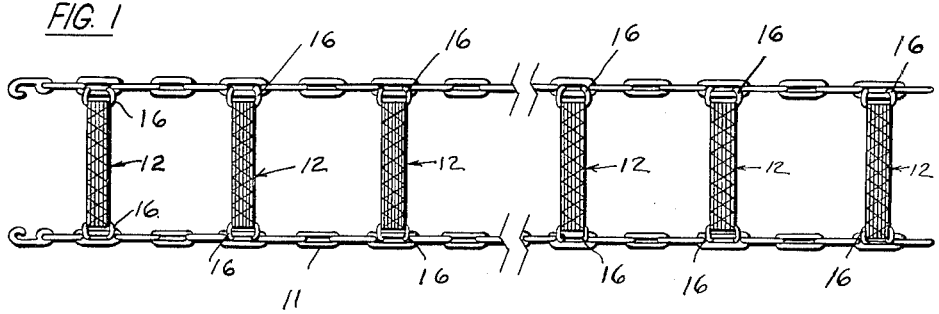
FIG. 1 shows the improved cross chain attached to a side chain.
Figure 3:
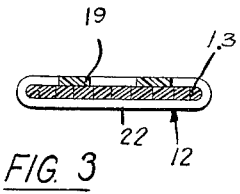
FIG. 3 is a cross sectional view of the skid chain taken on line 3—3 of FIG. 2.

Now with more specific reference to the drawing, FIG. 1 shows a skid chain for a tire having a side chain 11 with a cross member 12 made of transverse nylon cords 13 and diagonal cord 19 disposed in a matrix 15 or the like. The rubber matrix 15 is molded around the nylon to form a road engaging surface. The nylon forms a reinforcing structure. The cords 13 extend continuously from one hook to the other. Fastening members 16 are embedded in the rubber and form fastening means for fastening the cross members 12 to the side chains 11. The cord 19 is generally rectangular in cross section and passes across parallel to the part of the fastening members 16 between their ends 14 at 22 as shown by the dotted line in FIG. 2. The ends thereof are then crossed diagonally of the nylon cords 13 on the opposite side from the part shown by the dotted line. When the cords 13 and diagonal cord 19 are then dipped in rubber as hereinafter explained, the diagonal cord 19 reinforces the cords 13 of the cross member and prevents them from separating when the cross member encounters stones and other obstructions in the road.

Figures 2, 5:
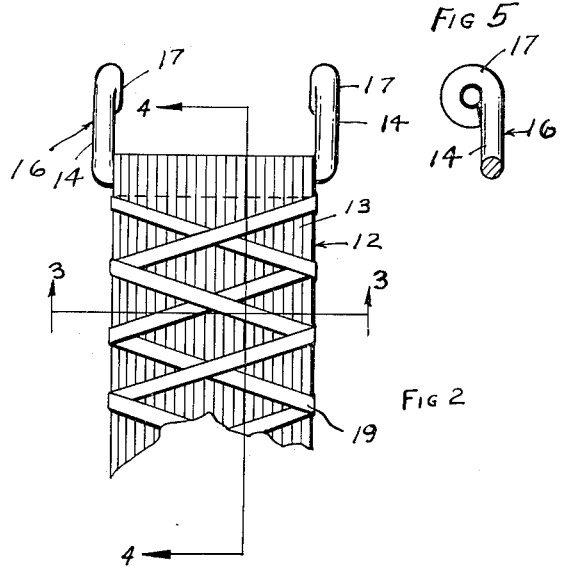
FIG. 2 is an enlarged view of the cross chain shown in FIG. 1.
FIG. 5 is an enlarged view of the hook member eye shown in FIG. 4.
Figure 4:
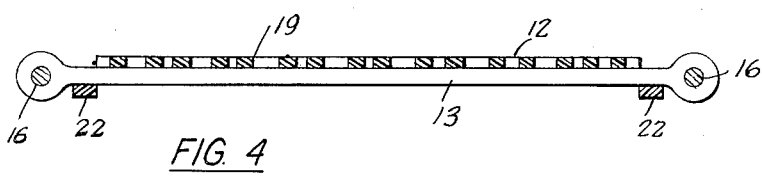
FIG. 4 is a view taken on line 4—4 of FIG. 2.

The cords 13 may be made of a continuous length of nylon or laced through the fastening members 16 to form a plurality of bight portions disposed in a common plane. The cord 19 is in a planar relation and may be crossed in a diagonal effect as shown in FIG. 2. After the transverse cords 13 and diagonal cords 19 are in place they may then be dipped in rubber.

The nylon cords 13 are attached to the intermediate part of the fastening members 16 at each end thereof. The fastening members 16 are U-shaped and their ends 14 terminate in eyes 17 on the ends thereof for attaching the cross chains 12 to the side chains 11. Each U-shaped member has a straight part intermediate the ends 14 which is disposed generally parallel to the side chains. The eyes 17 may be sprung open, hooked onto the chains and then forced to a closed position as shown.

When the cross members 12 are installed on the side chains 11 and put on a tire, they will operate silently and little or no bumps will occur during driving. The chains will not damage automatic transmissions by jerking or otherwise disturbing them. The device will give better traction than ordinary skid chain devices and other advantages will occur on hills and slippery roads. Since the device is at least four times as wide as it is thick, it forms a flat road engaging surface and thus avoids bumps.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A skid chain comprising spaced side chains disposed, when in use, generally in parallel planes, spaced generally U-shaped cross members attached to said side chains and having a straight party generally parallel to said side chains, a continuous length of material having the properties of nylon laced around said straight parts a plurality of times to form a plurality of bight portions disposed in a common plane, each said bight portion extending from one said U-shaped member to the other, a diagonal cord passing around said bight portions adjacents said U-shaped members on a first side and extending diagonally across the second side of said bight portions, and unlike material molded over said bight portions and said diagonal cord forming a matrix therefor forming a flat relatively thin cross member.

References Cited in the file of this patent
UNITED STATES PATENTS

| | | |
|---|---|---|
| 1,830,556 | Nelson | Nov. 3, 1931 |
| 1,871,424 | Olmstead | Aug. 9, 1932 |
| 2,163,890 | Ryan | June 27, 1939 |
| 2,273,200 | Hoff | Feb. 17, 1942 |